(12) United States Patent
Maki

(10) Patent No.: US 8,559,079 B2
(45) Date of Patent: Oct. 15, 2013

(54) IMAGE PROCESSING APPARATUS, IMAGE PROCESSING METHOD, AND PROGRAM THEREOF

(75) Inventor: Yoichiro Maki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 277 days.

(21) Appl. No.: 13/008,247

(22) Filed: Jan. 18, 2011

(65) Prior Publication Data

US 2011/0176189 A1    Jul. 21, 2011

(30) Foreign Application Priority Data

Jan. 18, 2010 (JP) ................................. 2010-007760

(51) Int. Cl.
*H04N 1/04* (2006.01)
(52) U.S. Cl.
USPC ............................. 358/505; 358/518; 358/1.9
(58) Field of Classification Search
USPC .......................................... 358/505, 518, 1.9
See application file for complete search history.

(56) References Cited

U.S. PATENT DOCUMENTS

| | | | |
|---|---|---|---|
| 5,903,288 A | 5/1999 | Yamaguchi | |
| 2004/0239969 A1* | 12/2004 | Shoda et al. | ................... 358/1.9 |
| 2006/0023943 A1 | 2/2006 | Makino | |
| 2009/0190193 A1* | 7/2009 | Sato | ............................... 358/505 |
| 2009/0295847 A1* | 12/2009 | Mukai et al. | ...................... 347/6 |
| 2010/0188673 A1 | 7/2010 | Makino | |
| 2010/0309243 A1 | 12/2010 | Nakano et al. | |

FOREIGN PATENT DOCUMENTS

| | | |
|---|---|---|
| JP | 09-216388 A | 8/1997 |
| JP | 10-215381 A | 8/1998 |
| JP | 2001-211334 A | 8/2001 |
| JP | 2002-142122 A | 5/2002 |
| JP | 2006-042267 A | 2/2006 |
| JP | 2009-269321 A | 11/2009 |

* cited by examiner

*Primary Examiner* — Houshang Safaipour
(74) *Attorney, Agent, or Firm* — Nutter McClennen & Fish LLP; John J. Penny, Jr.; Christina M. Sperry

(57) ABSTRACT

Disclosed herein is an image processing apparatus comprising: a read unit that reads a target to be read as color data of N colors (N is a positive integer) that form a color space; a generator that generates pixel data of one pixel from the read color data of the N colors; a determining unit that determines whether the generated pixel data is present in an achromatic edge area that includes an achromatic edge; and a processing unit that, if the generated pixel data is determined to be present in the achromatic edge area, generates, for pixels in the achromatic edge area, achromatic pixel data of the color space from one item of the read color data of the N colors forming the color space and also generates image data from the generated achromatic pixel data.

10 Claims, 6 Drawing Sheets

| R | G | R | G | R | G | R |
|---|---|---|---|---|---|---|
| G | B | G | B | G | B | G |
| R | G | R | G | R | G | R |
| G | B | G | B | G | B | G |

IMAGE PROCESSING APPARATUS, IMAGE PROCESSING METHOD, AND PROGRAM THEREOF

BACKGROUND

1. Technical Field

The present invention relates to an image processing apparatus, an image processing method, and a program thereof.

2. Related Art

With a proposed image processing apparatus in related art, RGB data undergoes IQ color difference conversion, and then color-monochrome determination is conducted to detect a monochromatic pixel around a pixel of interest. Depending on the result of this determination, whether the pixel of interest is a color shift pixel or a colored pixel is decided, and the colored pixel is examined again in consideration of the decision. Accordingly, a color shift at an edge of a black line is corrected by considering a color shift caused by optical deviation and mechanical vibration of the image processing apparatus at the time of inputting image data represented by RGB data and the like (see Japanese Unexamined Patent Application Publication No. 2001-211334, for example).

SUMMARY

Although the apparatus described above can correct a color shift caused at an edge of a black line, the apparatus cannot increase the resolution at the edge of this black line. A high resolution is desirable at black line edges because they affect the visibility of, for example, characters.

An advantage of some aspects of the invention is to provide an image processing apparatus and an image processing method that can achieve a reduced color shift and an increased resolution in an achromatic area, as well as a program thereof.

According to an aspect of the invention, components described below are used to obtain the above advantage.

The image processing apparatus according to an aspect of the invention has a read unit that reads a target to be read as the color data of N colors (N is a positive integer) that form a color space, a generator that generates pixel data of one pixel from the read color data of the N colors, a determining unit that determines whether the generated pixel data is present in an achromatic edge area that includes an achromatic edge, and a processing unit that, if the generated pixel data is determined to be present in the achromatic edge area, generates, for the pixels in the achromatic edge area, achromatic pixel data of the color space from one item of the read color data of the N colors forming the color space, and also generates image data from the generated achromatic pixel data.

This image processing apparatus reads the target to be read, which is a plurality of pixels, as the color data of N colors, and identifies an achromatic edge area that includes an achromatic edge in the read area. The image processing apparatus then uses one read color data item to generate achromatic pixel data of the color space for the pixels in the identified achromatic edge area, and also generates image data from the generated achromatic pixel data. A plurality of adjacent color data items, for example, may be used together to generate pixel data of one pixel. In this case, different color data items may be read from different positions, and thereby a color shift may occur from the color of the target to be read. According to the aspect of the invention, in an achromatic edge area, one color data item that has been read is used to generate achromatic pixel data in a color space, so a color shift is reduced. Since the one read color data item is the value of one pixel, a higher resolution can be obtained than when, for example, a plurality of color data items are handled together to take the value of one pixel. Accordingly, a reduced color shift and an increased resolution are achieved in an achromatic area.

The color space used may be an RGB color space, in which red (R), green (G), and blue (B) are used as primary colors. Alternatively, the color space may be a CMYK color space, in which cyan (C), magenta (M), and yellow (Y) are used as primary colors. In the RGB color space, color data may be R values, G values, and the like, and achromatic pixel data (pixel data) may be RGB values. In the CMYK color space, color data may be C values and M values, and achromatic pixel data (pixel data) may be CMYK values. To generate the achromatic pixel data, the processing unit may use the one read color data item as a color data value for the N colors.

The processing unit in the image processing apparatus according to the aspect of the invention may generate pixel data of one pixel from the color data of N adjacent colors in the read color data. If the generated pixel data is present in the achromatic edge area, the processing unit may use the color data of N colors included in the pixel data, which has been generated on the basis of the positions of the color data read by the read unit, as the achromatic pixel data of N pixels to generate the image data. Therefore, the resolution can be relatively easily increased to N times by generating pixel data of one pixel from the N-color data and then increasing the generated pixel data to N times.

The image processing apparatus according to the aspect of the invention may generate pixel data of one pixel from the color data of N adjacent colors in the read color data, and may identify an achromatic edge area on the basis of brightness information obtained from the generated pixel data. Accordingly, the achromatic edge area can be easily identified and the resolution can also be easily increased. In this case, to identify the achromatic edge area, the image processing apparatus may determine whether the pixel is achromatic on the basis of differences among color data values included in the generated pixel data, and may identify the achromatic edge area by using a brightness value included in the obtained brightness information.

The processing unit in the image processing apparatus according to the aspect of the invention may also use the color data of the pixels adjacent to a pixel in an area other than the achromatic edge area to generate pixel data of the color space through an interpolation process, and may use the generated pixel data to generate image data. Accordingly, the resolution of the entire image data can be increased by use of the interpolation process. Interpolation processes include, for example, nearest neighbor interpolation, bilinear interpolation, and bicubic interpolation. When pixel data of one pixel is generated from the color data of adjacent N colors, the processing unit may also use the color data of pixels adjacent to a pixel in other than the achromatic edge area to generate pixel data of N pixels through an interpolation process, and may use the generated pixel data to generate image data.

The read unit in the image processing apparatus according to the aspect of the invention may have opto-electric conversion devices, arranged in a main scanning direction, which opto-electrically convert light obtained through the target to be read. The read unit may select a light beam, one at a time, from the N-color light beams constituting the color space and direct the selected light beam to the target. The read unit may also move in a sub-scanning direction and read the target. Accordingly, in a case in which a target is read by selecting a color, one at a time, from N colors generated by opto-electric conversion devices arranged in a main scanning direction and by moving the opto-electric conversion devices in a sub-scanning direction, the resolution can also be increased in the sub-scanning direction by increasing the moving speed in the sub-scanning direction. Both a fast read speed and a high resolution are thereby achieved.

The image processing apparatus according to the aspect of the invention may have a printer that has an achromatic coloring agent and a chromatic coloring agent, the achromatic coloring agent having a higher forming density on a print medium than the chromatic coloring agent. The image processing apparatus may also have a print controller that controls the printer so that the coloring agents are transferred to the print medium. The print controller may control the printer so that the coloring agents are transferred to the print medium on the basis of the image data generated by the processing unit. Then, an image on which the achromatic areas have a high resolution can be printed with a high achromatic forming density, so a print image with a high resolution in the achromatic areas can be obtained.

The image processing method according to an aspect of the invention includes a step of reading a target to be read as the color data of N colors (N is a positive integer) that form a color space, a step of generating pixel data of one pixel from the read color data of the N colors, a step of determining whether the generated pixel data is present in an achromatic edge area that includes an achromatic edge, and a step of generating, if the generated pixel data is determined to be present in the achromatic edge area, achromatic pixel data of the color space from one item of the read color data, for the pixels in the achromatic edge area, and also generating image data from the generated achromatic pixel data.

As with the image processing apparatus described above, in the achromatic edge area in this image processing method, one item of color data that has been read is used to generate achromatic pixel data for the color space, so the color shift can be reduced. Since the one read color data item is the value of one pixel, a higher resolution can be obtained than when, for example, a plurality of color data items are handled together to take the value of one pixel. Various forms of the above image processing apparatus may be used in the image processing method. Steps that implement functions of the image processing apparatus may be added.

The program according to an aspect of the invention causes one or more computers to execute the steps of the image processing method described above. The program may be stored on a storage medium that the computers can read (such as a hard disk, ROM, FD, CD, and DVD). Alternatively, the program may be distributed from a computer to another through a transmission medium (the Internet, a LAN, or another communication network). Any other form may be used to transfer the program. When this program is executed by a single computer or a plurality of computers, among which the steps of the program are shared, the steps of the image processing method described above are executed, obtaining the same effect as the image processing method.

BRIEF DESCRIPTION OF THE DRAWINGS

The invention will be described with reference to the accompanying drawings, wherein like numbers reference like elements.

FIG. 6 illustrates a color CCD.

DESCRIPTION OF EXEMPLARY EMBODIMENTS

Figure 1:
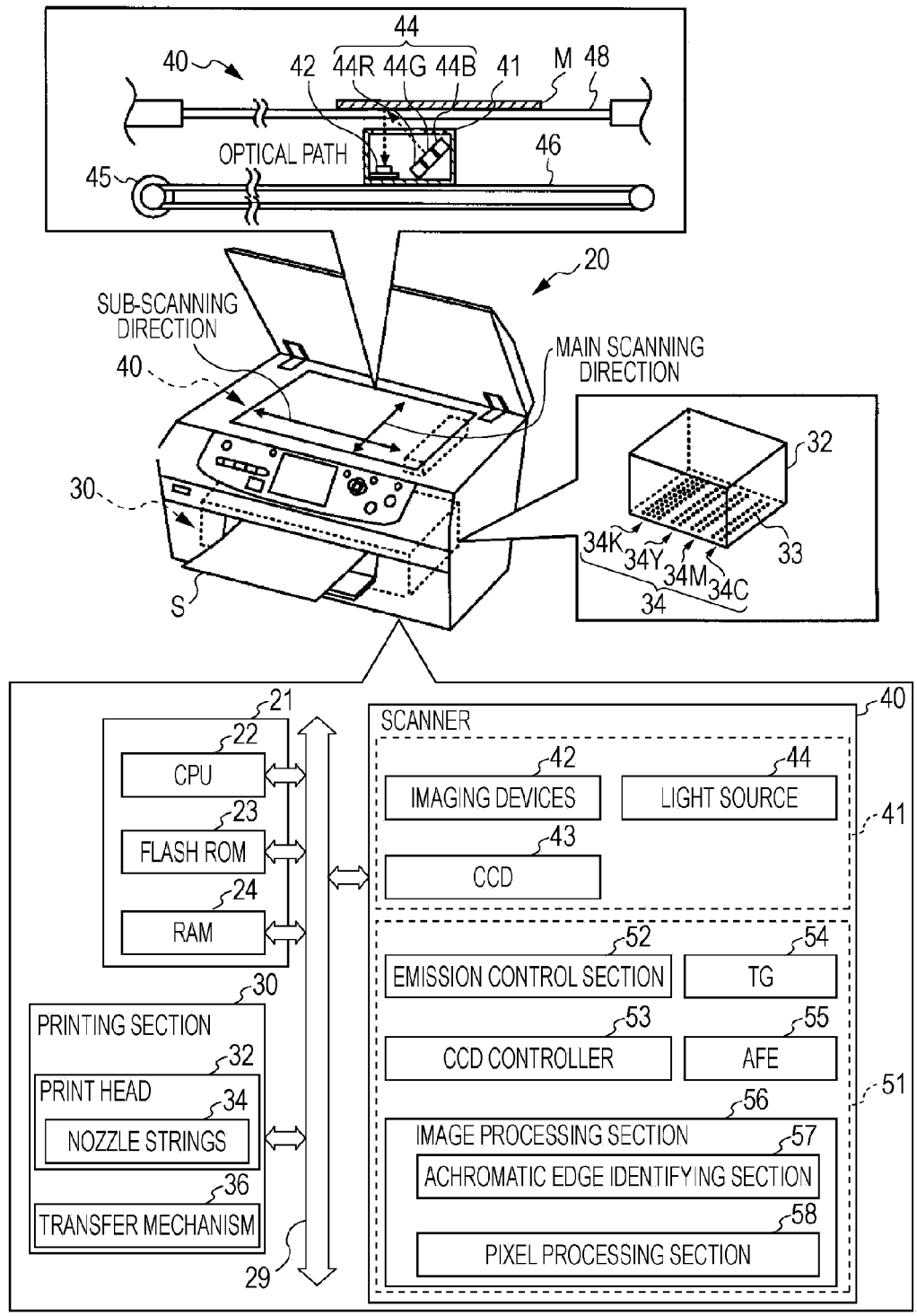
FIG. 1 schematically shows the structure of a printer according to an embodiment of the invention.

Next, an embodiment of the invention will be described with reference to the drawings. FIG. 1 schematically shows the structure of a printer 20 in the embodiment of the invention. The printer 20, which includes a printing section 30 and a scanner 40 as shown in FIG. 1, is structured as a multi-function printer having a printer function, scanner function, and copy function. The printing section 30 expels inks used as coloring agents to recording paper S used as a print medium. The scanner 40 reads a manuscript M placed on a glass surface 48. The printer 20 also includes a main controller 21 that controls the printer 20 overall. In the printer 20, the main controller 21, printing section 30, and scanner 40 are electrically interconnected through a bus 29.

The main controller 21 is structured as a microprocessor, the main component of which is a CPU 22. The main controller 21 further includes a flash ROM 23, in which various types of processing programs are stored and data can be rewritten, as well as a RAM 24, in which data is temporarily stored and data is saved. The main controller 21 controls the printing section 30 so as to execute a print process and also controls the scanner 40 so as to execute an image reading process.

The printing section 30 includes a print head 32 provided on the bottom surface of a carriage supported so as to be movable in a horizontal direction of the main body, a transfer mechanism 36 that transfers the recording paper S in the transfer direction, and ink cartridges (not shown) that hold inks, the inks being supplied from the ink cartridges to the print head 32 through ink tubes. A plurality of nozzles 33, from which cyan (C), magenta (M), yellow (Y), and black (K) inks are expelled, are provided on the bottom surface of the print head 32. The nozzles 33 and their nozzle strings 34 are generic names for these colors. The nozzle and nozzle string for cyan will be referred to below as a nozzle 33C and a nozzle string 34C. The nozzle and nozzle string for magenta will be referred to below as a nozzle 33M and a nozzle string 34M. The nozzle and nozzle string for yellow will be referred to below as a nozzle 33Y and a nozzle string 34Y. The nozzle and nozzle string for black will be referred to below as a nozzle 33K and a nozzle string 34K. With the printer 20, more nozzles 33K in black, which is achromatic, are provided than the monochromatic nozzles 33C, 33M, and 33Y. That is, these nozzles are arranged so that the print density of the achromatic black ink is higher than the print density of the chromatic inks. In this embodiment, the resolution of the nozzles 33C, 33M, and 33Y is 300 dpi, and the resolution of the nozzle 33K is 600 dpi. The print head 32 expels the inks from the nozzles 33 by a method in which a voltage is applied to a piezoelectric device to deform it and thereby pressurize the pertinent ink. The mechanism that applies a pressure to the inks may use bubbles generated by heat from a heater. The transfer mechanism 36 includes a paper feeding roller disposed near a place from which the recording paper S is supplied, and also includes a transfer roller disposed near a place from which the recording paper S is ejected.

The scanner 40 includes a contact image sensor (CIS) unit 41 that reads an image formed on the manuscript M placed on the glass surface 48, a drive roller 45 that moves the CIS unit 41 in the sub-scanning direction through a belt 46, and a control unit 51 that controls the scanner 40. The CIS unit 41 includes imaging devices 42 that read an image by receiving light reflected on the manuscript M, a CCD 43 that receives charges from the imaging devices 42 and transfers the received charges to the control unit 51, and a light source 44 that emits light to the manuscript M. The imaging devices 42 are opto-electric conversion devices that are arranged in the main scanning direction and correspond to pixels. When exposed to light, the imaging devices 42 convert the light to charges and store the converted charges. The light source 44 internally has a red LED 44R that lights in red, a green LED 44G that lights in green, and a blue LED 44B that lights in blue. The light source 44 is structured so that light from any of these LEDs can be directed the manuscript M. The CIS unit 41 moves in the sub-scanning direction as the belt 46 is driven by the drive roller 45. The CCD image sensor is just an example; a CMOS image sensor may be used instead. The control unit 51 has an emission control section 52 that controls light emission from the light source 44, a CCD controller 53 that controls the driving of the CCD 43, a timing generator (TG) 54 that outputs start timing signals for various operations of the CIS unit 41 and other signals, an analog front end (AFE) 55 that converts an electric signal received from the CIS unit 41 to a digital signal, and an image processing section 56 that performs a prescribed process on the signal received from the AFE 55 to generate digital image data. The emission control section 52 outputs a lighting signal and other signals to the light source 44. The CCD controller 53 generates a drive clock equivalent to a read timing signal, which is generated on the basis of a main clock received from the main controller 21, and outputs the generated drive clock to the TG 54. The TG 54 generates drive pulses, for the CIS unit 41, by which the read resolution becomes 1200, 600, and 300 dpi. The image processing section 56 has an achromatic edge identifying section 57 that identifies an achromatic edge area including an achromatic edge, and also has a pixel processing section 58 that generates pixel data on the basis of whether the area is an achromatic edge area and then generates image data from the generated pixel data.

Figure 2:
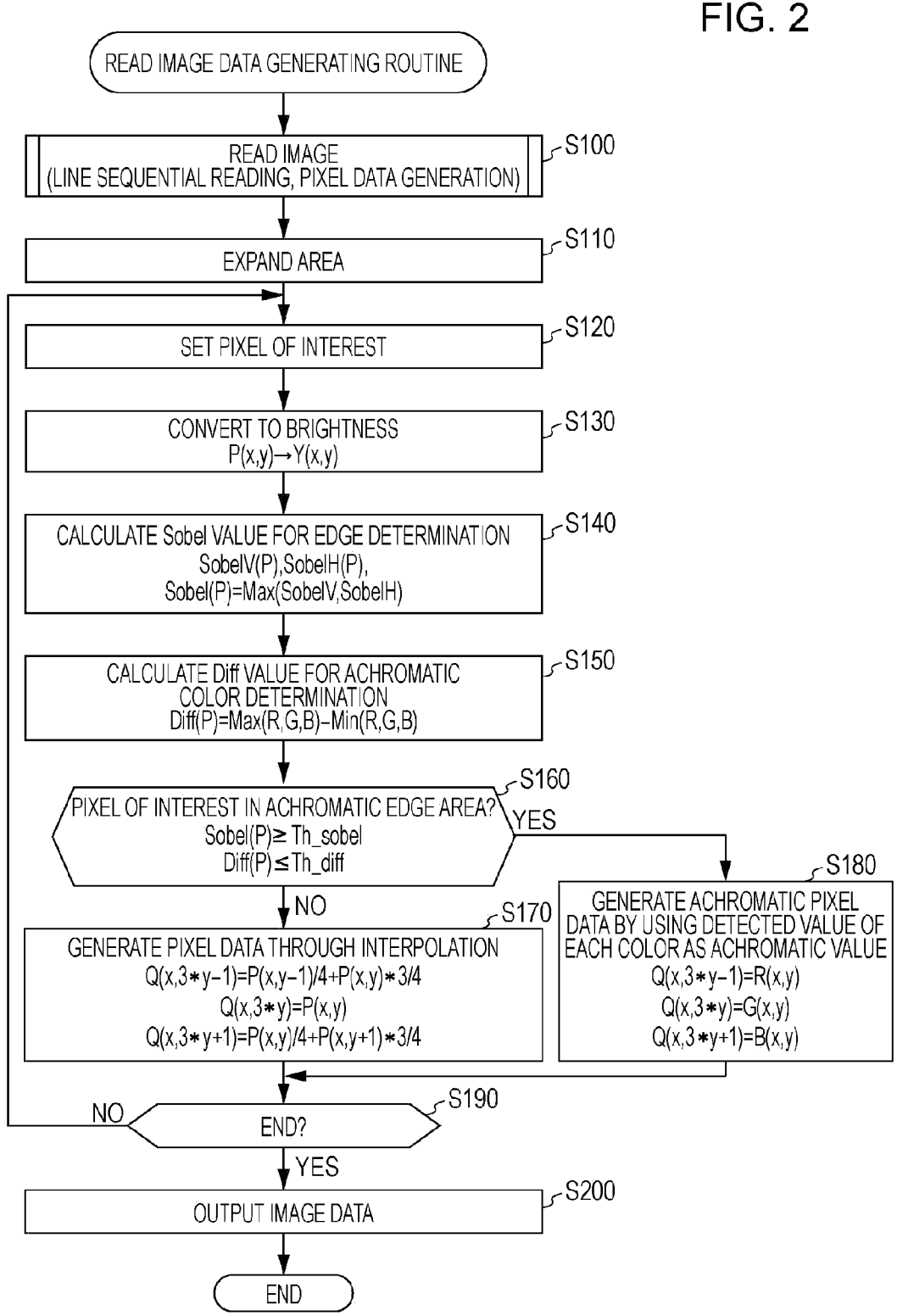
FIG. 2 is a flowchart illustrating an example of a read image data generating routine.

Next, the operation of the printer 20 structured as described above in this embodiment will be described, particularly when the manuscript M placed on the glass surface 48 is read. FIG. 2 is a flowchart illustrating an example of a read image data generating routine executed by the CPU 22 in the main controller 21. This routine is stored in the flash ROM 23, and executed upon receipt of a high-speed, high-resolution copy command from an operation panel (not shown). In a process mainly described below, to read an image, the CIS unit 41 is moved in the sub-scanning direction at a relatively high speed, and the read image with a resolution of 600 dpi by 200 dpi is expanded to an image with a resolution of 600 dpi by 600 dpi in the sub-scanning direction. When the routine is executed, the CPU 22 causes the scanner 40 to read an image (step S100). In the process to read this image, a light beam is selected, one at a time, from light of three primary colors constituting a color space, and the selected light beam is emitted from the light source 44 to the manuscript M. Then, the CIS unit 41 is moved in the sub-scanning direction to read the manuscript M. This process is a so-called line sequential process. The color space read by the scanner 40 is an RGB color space. R values, G values, and B values are called color data (denoted R value (255), for example), and pixel values, which are RGB value, are called pixel data (denoted RGB values (255, 255, 255), for example). The emission control section 52 selects a light beam one at a time from the light source 44 in emission control. The TG 54 sets a timing at which charges are accumulated in the imaging devices 42. The CCD controller 53 reads charges accumulated in the imaging devices 42. The AFE 55 amplifies the charges and outputs the amplified charges to the image processing section 56. The read result obtained in this line sequential process is such that color data of the same type (R values, for example) is linearly arranged in the main scanning direction and color data of different types linearly alternates. In this embodiment, three color data items (R value, G value, and B value) adjacent in the sub-scanning direction in the obtained read result are combined together to generate pixel data (RGB values) of one pixel.

Figure 3:
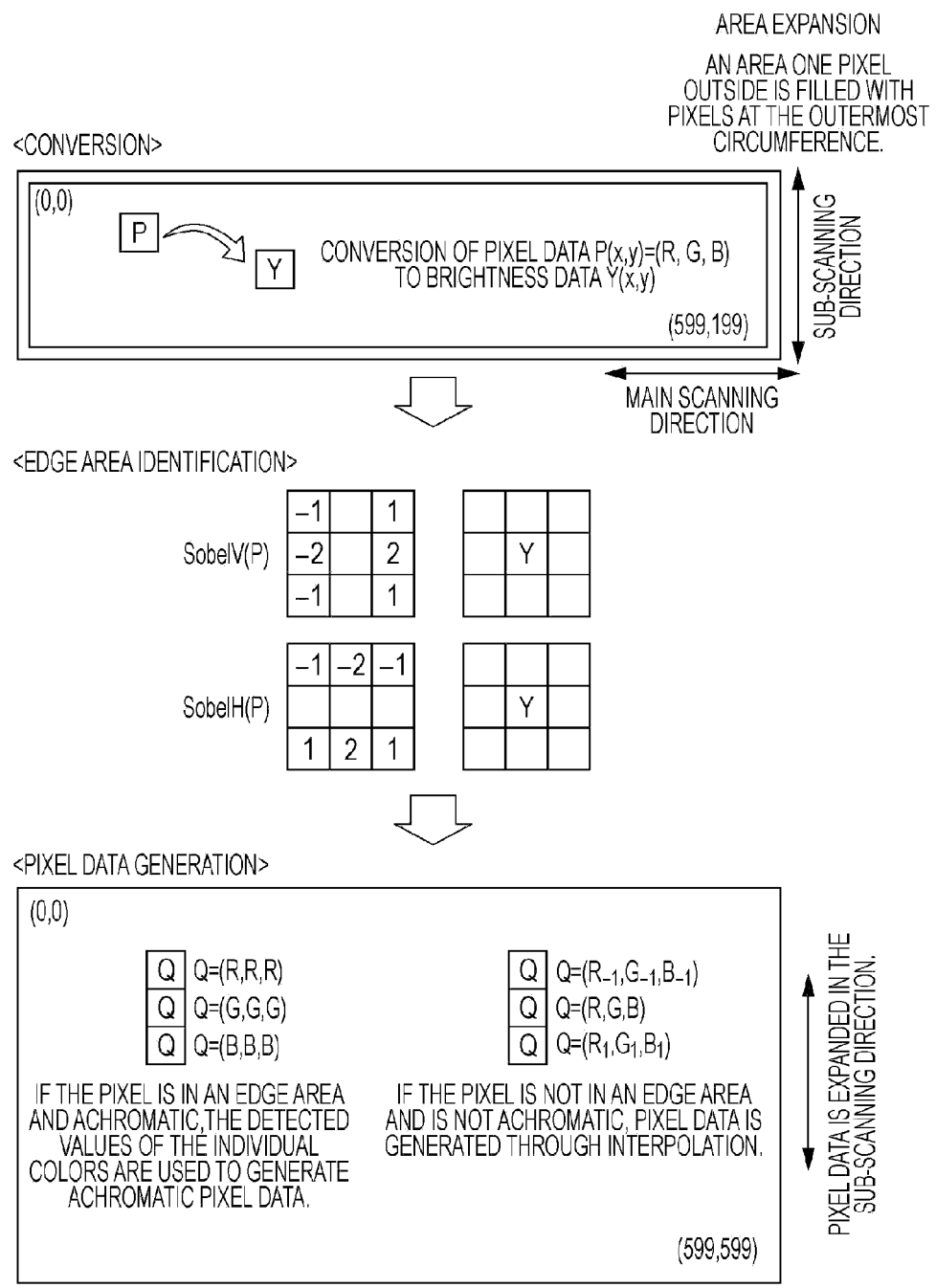
FIG. 3 illustrates processes of the read image data generating routine.

After the image reading process has been executed and a prescribed amount of pixel data has been accumulated, the CPU 22 executes an area expansion process (step S110). FIG. 3 illustrates processes of the read image data generating routine. In this area expansion process, an area one pixel outside the pixels at the outermost circumference of the read result is filled with pixels of the same type as the pixels at the outermost circumference so that an achromatic edge area identification process and the like can be executed for the pixels at the outermost circumference of the read result (see the upper figure in FIG. 3). The prescribed amount of pixel data may be, for example, pixel data in three rows so that the edge identification process can be executed.

Next, the CPU 22 executes the achromatic edge area identification process (steps S120 to S160). In this process, the achromatic edge identifying section 57 identifies an achromatic edge area that includes an achromatic edge. The CPU 22 first sets pixels P (x, y) of interest that are used to determine whether there is an edge and whether a pixel is achromatic (step S120). In this embodiment, pixels of interest are set sequentially to the right, starting from the left end of the top row of the read data. Other pixels of interest are then set sequentially from the left end one row below the previous row to the right. Finally, pixels of interest are set up to the right end on the last row. Upon completion of setting the pixels of interest, the CPU 22 converts the pixel data P (x, y) to brightness data Y (x, y) including brightness values (step S130, see the upper figure in FIG. 3). In this embodiment, the RGB color space is converted to a YCC color space.

The CPU 22 then calculates a Sobel value (P) (step S140). In this embodiment, a Sobel filter V (P) in the vertical direction and a Sobel filter H (P) in a horizontal direction are used to calculate the Sobel value (P) from the eight pixels adjacent to a pixel of interest (see the figure in the middle in FIG. 3). The CPU 22 then calculates a Diff value (P) (step S150), which is a difference among RGB values used to determine whether the pixel of interest is achromatic. The Diff value (P) can be obtained as the difference between the maximum and minimum RGB values of the pixel of interest. If the pixel of interest has RGB values (255, 210, 180), for example, then Diff (P) is determined to be 75 by subtracting 180 from 255. The CPU 22 uses the obtained Sobel value (P) and Diff value (P) to determine whether the pixel P (x, y) of interest is present in the achromatic edge area (step S160). In this embodiment, if the Sobel value (P) is equal to or greater than a threshold Thsobel, which has been experimentally determined, and the Diff value (P) is equal to or less than a threshold Thdiff, which has also been experimentally determined, then the pixel P (x, y) of interest is determined to be present in the achromatic edge area. The threshold Thsobel may be experimentally determined to be a value that can identify an edge area, for example. The threshold Thdiff may be experimentally determined to be a value (80, for example) that is allowed as being achromatic.

The CPU 22 then executes a pixel data generation process, which expands pixel data on the basis of whether the pixel of interest is present in an achromatic edge area (steps S170 and S180). In this process, the pixel processing section 58 uses one color data item read in the line sequential process to generate three-fold achromatic edge area in the sub-scanning direction as the values of the three primary colors of the RGB color space. In a non-achromatic edge area, the pixel processing section 58 performs interpolation and generates three-fold pixels in the sub-scanning direction. First, in step S160, if the pixel P (x, y) of interest is not in an achromatic area, the CPU 22 uses the data of the pixels adjacent to the pixel of interest in the sub-scanning direction to generate three-fold pixel data in the sub-scanning direction through an interpolation process (step S170). In this embodiment, the center of the three generated pixels has the RGB values of the pixel P (x, y) of interest, and the other generated pixels have pixel data that has been generated by performing interpolation on the data of the adjacent pixels. Interpolation processes include nearest neighbor interpolation, bilinear interpolation, and bicubic interpolation. Of these interpolation processes, bilinear interpolation and bicubic interpolation are preferable, so bilinear interpolation is performed in this embodiment. If the pixel P (x, y) of interest is present in the achromatic edge area in step S160, the CPU 22 uses one read color data item to generate three-fold achromatic pixel data in the sub-scanning direction, on the basis of the positions of the color data read by the CIS unit 41, as the values of the three primary colors of the RGB color space (step S180). For example, to generate the pixel data in step S100, emissions from the light source 44 were controlled in the order of R, G, B in the sub-scanning direction and a read operation was performed while the CIS unit 41 were being moved. If the pixel of interest is present in an edge area and is achromatic, achromatic pixel data items generated from the individual read color data items more accurately reflect the manuscript M than when one pixel data item is generated by combining the individual read color data items together. In this embodiment, in the sub-scanning direction, an R value is used as G and B values to generate pixel data (R, R, R). For the next pixel, a G value is used as R and B values to generate pixel data (G, G, G). For the further next pixel, a B value is used as R and G values to generate pixel data (B, B, B).

Figure 4:
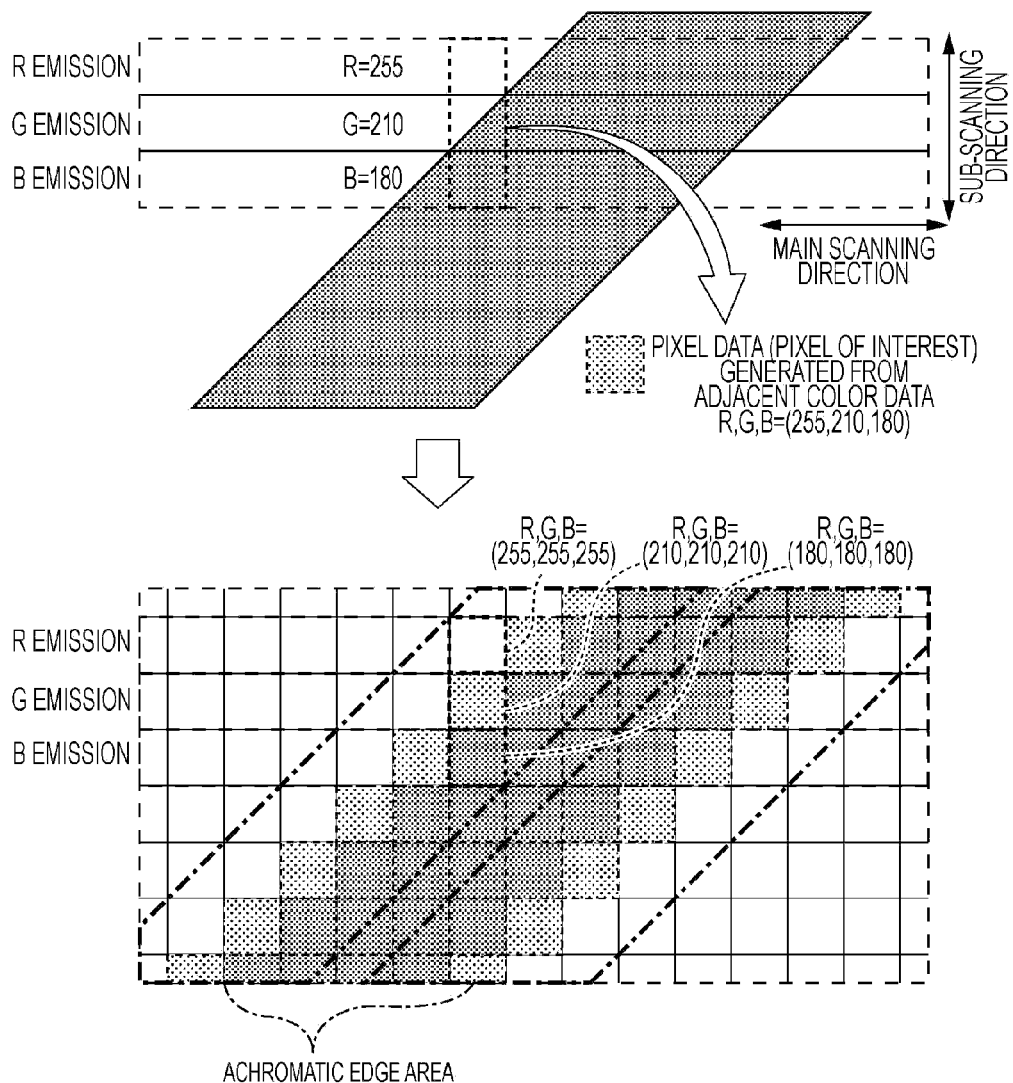
FIG. 4 illustrates generation of three-fold achromatic pixel data from one color data item.
Figure 5:
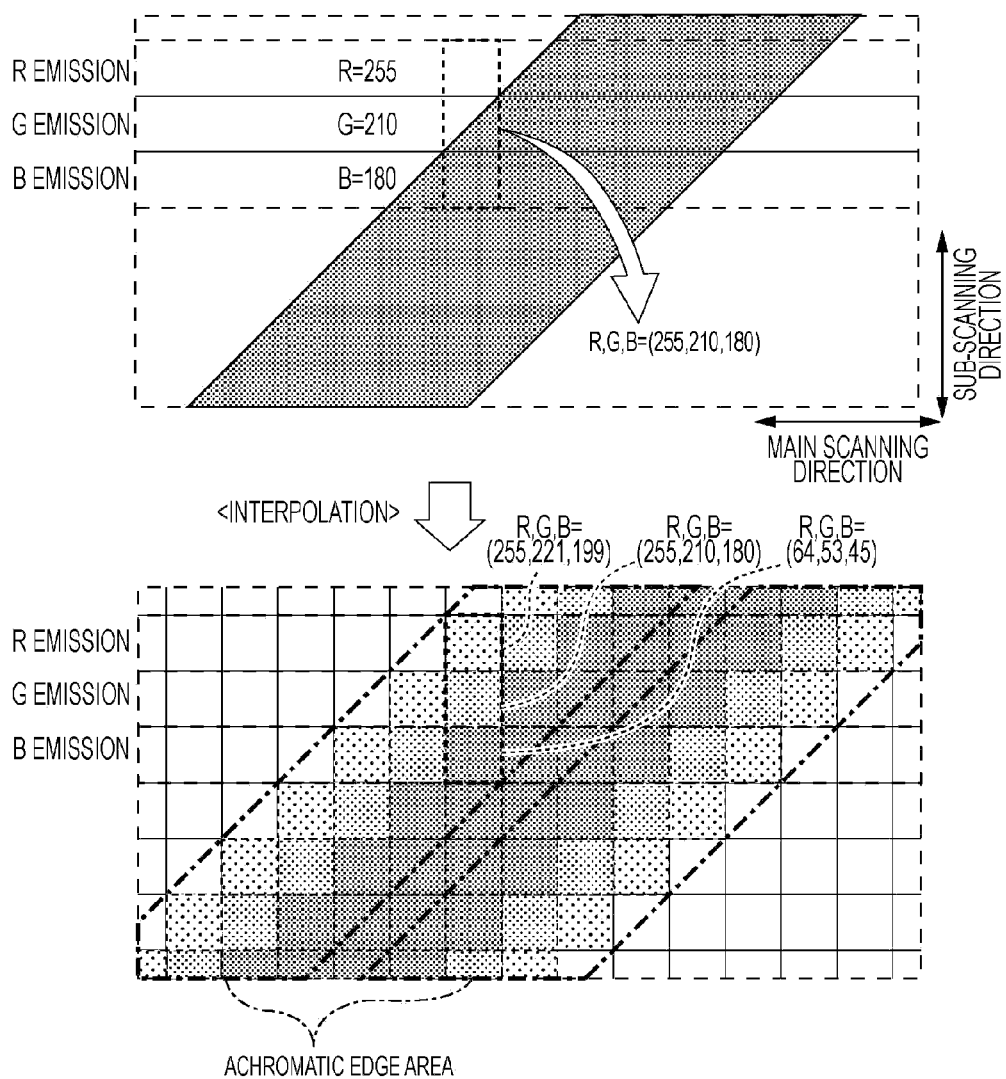
FIG. 5 illustrates an interpolation process performed on the data of adjacent pixels to generate pixel data.

Now, the pixel data generation process in steps S170 and S180 will be described by using a specific example. FIG. 4 illustrates generation of three-fold achromatic pixel data from one read color data item. FIG. 5 illustrates an interpolation process performed on the data of adjacent pixels to generate three-fold pixel data. As shown in FIGS. 4 and 5, when R value (255), G value (210), and B value (180) are read as color data, the process in step S100 produces RGB values (255, 210, 180) as the pixel data of the pixel of interest. When, for example, the pixel of interest is present in an achromatic edge area and a portion including a boundary between white and block areas is read as shown in FIG. 5, pixels that were originally present in the achromatic edge area become non-achromatic pixels, the pixel of interest itself may cause a color shift. Accordingly, when an interpolation process is performed on the pixel of interest, the generated pixels also cause a color shift (see the lower figure in FIG. 5). With the printer 20 in this embodiment, however, when the pixel of interest is present in an achromatic edge area as shown in FIG. 4, achromatic RGB values (255, 255, 255), (210, 210, 210), and (180, 180, 180) are respectively generated from the R value, G value, and B value on the basis of the read positions in the sub-scanning direction (see the lower figure in FIG. 3 and the lower figure in FIG. 4). As described above, since actually read values are used without alteration to generate three pixels, the resolution can be increased. Furthermore, since the three pixels are achromatic pixels, their color shift can be suppressed. Even when an interpolation process is performed on pixels in other than the achromatic edge area, including achromatic pixels, to generate three-fold pixel data, a color shift does not easily occur and a problem is less likely to occur. Pixel data in the achromatic edge area is expanded in this way.

After the pixel data has been generated in steps S170 and S180, the CPU 22 determines whether the achromatic edge area identification process and pixel data generation process have been performed on all pixel data in the read result (step S190). If these processes have not been terminated for all the pixel data, the processes in step S120 and later described above are repeated. That is, the next pixel of interest is set and the achromatic edge area identification process and pixel data generation process are executed on the set pixel of interest. If these processes have been terminated for all the pixel data, image data is generated by using the generated pixel data as pixel values. The generated image data is output to the printing section 30 (step S200), terminating the routines. Upon receipt of the image data, the printing section 30 executes a print process. In the print process, the CPU 22 in the printer 20 drives the transfer mechanism 36 to transfer the recording paper S, and controls the print head 32 so that it expels inks on the recording paper S on the basis of the image data. Since the read image data has a reduced color shift in the achromatic edge area and a three-fold resolution in the sub-scanning direction, the printing capacity of the print head 32, in which the print density of the black ink is increased, can be adequately derived, and thereby a superior print result can be obtained.

The relationship between the components in the embodiment of the invention and the components in aspects of the invention will be clarified. The CIS unit 41 in the embodiment corresponds to the reading unit in the aspects of the invention, the main controller 21 and achromatic edge identifying section 57 in the embodiment correspond to the identifying unit in the aspects of the invention, the main controller 21 and pixel processing section 58 in the embodiment correspond to the processing unit in the aspects of the invention, the printing section 30 in the embodiment corresponds to the printer in the aspects of the invention, and the main controller 21 in the embodiment corresponds to the print controller in the aspects of the invention. The manuscript M in the embodiment corresponds to the target to be read in the aspects of the invention, the inks in the embodiment correspond to the coloring agents in the aspects of the invention, and the recording paper S corresponds to the print medium in the aspects of the invention. In the embodiment, an example of the image processing method in an aspect of the invention is clarified by explaining the operation of the printer 20.

The printer 20 in the embodiment, which has been described in detail, reads the manuscript M by handing a plurality of pixels as the color data of an RGB color space of three primary colors, and identifies an achromatic edge area in the read area. The printer 20 then uses one read color data item to generate achromatic pixel data of the RGB color space for the pixels in the identified achromatic edge area, and also generates image data from the generated achromatic pixel data. As described above, in the achromatic edge area, one item of color data that has been read is used to generate achromatic pixel data for the color space, so it is possible to reduce a color shift of the type that is caused when the pixel data of one pixel is generated from a plurality of adjacent color data items. Since the one read color data item is the value of one pixel, a higher resolution can be obtained than when, for example, a plurality of color data items are handled together to take the value of one pixel.

When pixel data of one pixel is generated from the color data of three adjacent colors in the read color data, the generated pixel data may be present in an achromatic edge area. Then, image data is generated by using the color data of the three colors included in the pixel data generated on the basis of the positions of the color data read by the CIS unit 41 as the achromatic pixel data of the three pixels. Accordingly, the resolution can be relatively easily increased to three times. Furthermore, since the achromatic edge area is identified on the basis of brightness information obtained from the pixel data of one pixel that have been generated from the color data of three adjacent colors in the read color data. Accordingly, the achromatic edge area can be easily identified and the resolution can also be easily increased. Furthermore, since whether the pixel is achromatic is determined on the basis of differences among color data values included in the pixel data of one pixel, which has been generated from the color data of the adjacent three colors in the read color data, an achromatic area can be identified by a relatively simple process. The color data of the pixels adjacent to a pixel in other than the achromatic edge area is also used to generate data of three pixels through an interpolation process, so the resolution of the entire image data can be increased by use of the interpolation process. The CIS unit 41 has the imaging devices 42, which are opto-electric conversion devices, arranged in the main scanning direction. The CIS unit 41 selects a light beam, one at a time, from the light beams of the three colors constituting the RGB color space, directs the selected light beam to the manuscript M, moves the opto-electric conversion devices in the sub-scanning direction, and reads the manuscript M. Accordingly, the resolution can also be increased in the sub-scanning direction by increasing the moving speed of the CIS unit 41 in the sub-scanning direction. Both a fast read speed and a high resolution are thereby achieved. Furthermore, the print head 32 of the printing section 30 includes more nozzle strings 34 of the achromatic ink than nozzle strings of the monochromatic inks, that is, the print density of the achromatic black ink is higher than the print density of the chromatic inks. Therefore, an image having a high resolution in the achromatic area can be used to achieve printing with a high achromatic print density and thereby a printed image having a high resolution in the achromatic area can be obtained.

The embodiment of the invention described above is not a limitation. It will be appreciated that various aspects are possible without departing from the technical scope of the embodiment of the invention.

For example, in the embodiment described above, the pixel data of one pixel has been generated from the color data of three adjacent colors in the read color data, and the generated pixel data has been used for brightness conversion to identify an edge area. However, this is not a limitation if an edge area can be identified. It may not be necessary to generate the pixel data of one pixel from the color data of three adjacent colors or to perform brightness conversion. In addition, although an achromatic area has been identified on the basis of differences among the color data values of the pixel data of one pixel generated from the color data of three adjacent colors in the read color data, this is not a limitation if an achromatic edge area can be identified. It may not be necessary to generate pixel data of one pixel from the color data of the three adjacent colors or calculate the differences among the color data values. Any method can be used without any restrictions if it can identify an achromatic edge area.

In the embodiment described above, a Sobel value (P) and a Diff value (P) have been used to identify an achromatic edge area in step S160. However, another condition may be substituted for or added to these values. For example, a condition may be used to determine whether there are white and black areas around a pixel of interest (around eight by eight pixels, for examples). Although the manuscript M and the read result have not been described in the above embodiment, the areas adjacent to the achromatic edge area are preferably white in color. Then, an achromatic edge area can be easily identified and a color shift is less likely to occur.

Although pixel data to be read has been values of an RGB color space, this is not a limitation. The values of a CMY(K) color space may be used instead, for example.

In the embodiment described above, the manuscript M has been read with a resolution of 600 dpi by 200 dpi and the resolution has been increased to 600 dpi by 600 dpi. However, this is not a limitation. For example, the manuscript M may be read with a resolution of 600 dpi by 300 dpi, the resolution may then be increased to three times in the sub-scanning direction, that is, to 600 dpi by 900 dpi, after which the resolution may be reduced to 600 dpi by 600 dpi. In this case as well, the same effect as in the above embodiment can be obtained. When an image is read, it is more preferable to shorten the read time by increasing the moving speed of the CIS unit 41 than to read the image with a resolution of 600 dpi by 600 dpi.

Figure 6:
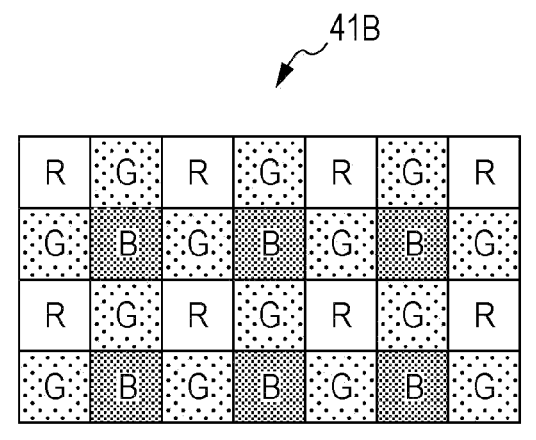

In the embodiment described above, linear read results of the RGB colors have been obtained by use of the CIS unit 41. However, this is not a limitation if pixels can be read by use of a plurality of primary colors in a prescribed color space. For example, the read unit used may emit white light to the manuscript M and may have a plurality of imaging devices, each of which can read one color of RGB. FIG. 6 illustrates the color CCD 41B. A color filter, in which a window of 2 pixels by 2 pixels is used as a unit, is placed on the CCD 41B and imaging devices. Each window has one R color and one B color on a diagonal line and also has two G colors on the opposite diagonal line. Each pixel can recognize any one of the R, G, and B colors. In this case, the pixel data can be expanded horizontally and vertically to increase the resolution. The use of this type of read unit also achieves a reduced color shift and high resolution.

In the embodiment described above, the multi-function printer, which can execute printing, scanning, and copying, has been described as the image processing apparatus according to the embodiment of the invention. However, the image processing apparatus may be a scanner alone or FAX machine. Although the processing in the above embodiment has been processing during copying, the processing may be processing executed while an image is read or during a FAX transmission. Although the scanner 40 has been of the flatbed type, in which the manuscript M is secured and the CIS unit 41 is moved to read the image, a type in which the CIS unit 41 is secured and the manuscript M is moved to read the image may be used instead. Although the printing section 30 has been of the inkjet type, an electrophotographic laser printer, a thermal transfer printer, or a dot impact printer may be used instead. Although the embodiment of the invention has been described with an aspect of the printer 20, an aspect of the image processing method or an aspect of a program thereof may be used instead.

The embodiment of the invention can be used in industries related to image processing.

The entire disclosure of Japanese Patent Application Nos. 2010-7760, filed Jan. 18, 2010 are expressly incorporated by reference herein.

What is claimed is:

1. An image processing apparatus comprising:
a read unit that reads a target to be read as color data of N colors (N is a positive integer);
a generator that generates pixel data of one pixel from the read color data of the N colors;
a determining unit that determines whether the generated pixel data is present in an achromatic edge area that includes an achromatic edge; and
a processing unit that, if the generated pixel data is determined to be present in the achromatic edge area, generates, for pixels in the achromatic edge area, achromatic pixel data from one item of the read color data of the N colors and generates image data from the generated achromatic pixel data.

2. The image processing apparatus according to claim 1, wherein if the generated pixel data is determined to be present in the achromatic edge area, color data of N colors included in the pixel data, which has been generated on the basis of positions of the color data read by the read unit, is used as achromatic pixel data of N pixels to generate the image data.

3. The image processing apparatus according to claim 1, further comprising an identifying unit that identifies the achromatic edge area on the basis of brightness information obtained from the generated pixel data.

4. The image processing apparatus according to claim 1, wherein the processing unit also uses color data of pixels adjacent to a pixel in an area other than the achromatic edge area to generate pixel data of the color space through an interpolation process, and uses the generated pixel data to generate image data.

5. The image processing apparatus according to claim 1, wherein:
the read unit has opto-electric conversion devices, arranged in a main scanning direction, which opto-electrically convert light obtained through the target to be read;
the read unit selects a light beam, one at a time, from N-color light beams constituting the color space and directs the selected light beam to the target; and
the read unit moves in a sub-scanning direction and reads the target.

6. The image processing apparatus according to claim 1, further comprising:
a printer that has an achromatic coloring agent and a chromatic coloring agent, the achromatic coloring agent having a higher forming density on a print medium than the chromatic coloring agent; and a print controller that controls the printer so that the coloring agents are transferred to the print medium;
wherein the print controller controls the printer so that the coloring agents are transferred to the print medium on the basis of the image data generated by the processing unit.

7. An image processing method, comprising:
reading a target to be read as color data of N colors (N is a positive integer);
generating pixel data of one pixel from the read color data of the N colors;
determining whether the generated pixel data is present in an achromatic edge area that includes an achromatic edge, and
generating, if the generated pixel data is determined to be present in the achromatic edge area, achromatic pixel data from one item of the read color data, for pixels in the achromatic edge area, and generating image data from the generated achromatic pixel data.

8. A non-transitory storage medium having stored thereon a program that causes one or more computers to execute the steps of the image processing method of claim 7.

9. An image processing apparatus comprising:
a read unit that reads a target to be read as color data of N colors (N is a positive integer) that form a color space;
a generator that generates pixel data of one pixel from the read color data of the N colors;
a determining unit that determines whether the generated pixel data is present in an achromatic edge area that includes an achromatic edge; and
a processing unit that, if the generated pixel data is determined to be present in the achromatic edge area, generates, for pixels in the achromatic edge area, achromatic pixel data of the color space from one item of the read color data of the N colors forming the color space and also generates image data from the generated achromatic pixel data;
wherein if the generated pixel data is determined to be present in the achromatic edge area, color data of N colors included in the pixel data, which has been generated on the basis of positions of the color data read by the read unit, is used as achromatic pixel data of N pixels to generate the image data.

10. The image processing apparatus according to claim 1, wherein the one item of the read color data of the N colors is one color in a color space formed by the N colors.

* * * * *